United States Patent [19]

Brinkmann et al.

[11] 3,938,927

[45] Feb. 17, 1976

[54] APPARATUS FOR THE CONTINUOUS MANUFACTURE OF CHIPBOARD PANELS, FIBRE PANELS OR THE LIKE

[75] Inventors: Heinz Brinkmann, Bennigsen; Rolf Gersbeck, Ronnenberg; Eckart Schlomach, Hannover, all of Germany

[73] Assignee: Hermann Berstorff Maschinenbau GmbH, Hannover-Kleefeld, Germany

[22] Filed: Apr. 22, 1975

[21] Appl. No.: 570,454

[30] Foreign Application Priority Data

Apr. 25, 1974 Germany .......................... 2420029

[52] U.S. Cl. ................................ 425/373; 425/224

[51] Int. Cl.[2] ............................................ B29J 5/08

[58] Field of Search ........... 425/224, 328, 362, 373

[56] References Cited

UNITED STATES PATENTS

| | | | |
|---|---|---|---|
| 2,143,627 | 1/1939 | Knowland | 425/373 |
| 2,182,168 | 12/1939 | Bierer | 425/373 |
| 2,182,317 | 12/1939 | Knowland | 425/373 |
| 2,185,959 | 1/1940 | Vogel-Jorgensen | 425/373 |
| 3,078,510 | 2/1963 | Rowe | 425/373 X |
| 3,832,115 | 8/1974 | Ettel | 425/373 |
| 3,874,962 | 4/1975 | Gersbeck et al. | 425/373 X |
| 3,891,376 | 6/1975 | Gersbeck et al. | 425/373 |

*Primary Examiner*—J. Howard Flint, Jr.
*Attorney, Agent, or Firm*—Donald D. Jeffery

[57] ABSTRACT

In apparatus for continuously pressing panels of particulate material, such as chips or fibres, a press drum with an endless belt looped partially therearound and pressed against the drum to press the panels between the drum and the belt, an inlet roller adjacent the drum, between which inlet roller and drum the belt carrying the particulate material to be pressed passes, a plurality of return rollers and a tensioning and control roller spaced from the inlet roller to form therebetween a horizontal pass of the belt onto which the particulate material to be pressed is sprinkled, the tensioning and control roller being adjustable in position to control tension and lateral movement of the belt.

7 Claims, 2 Drawing Figures

Figure 1:
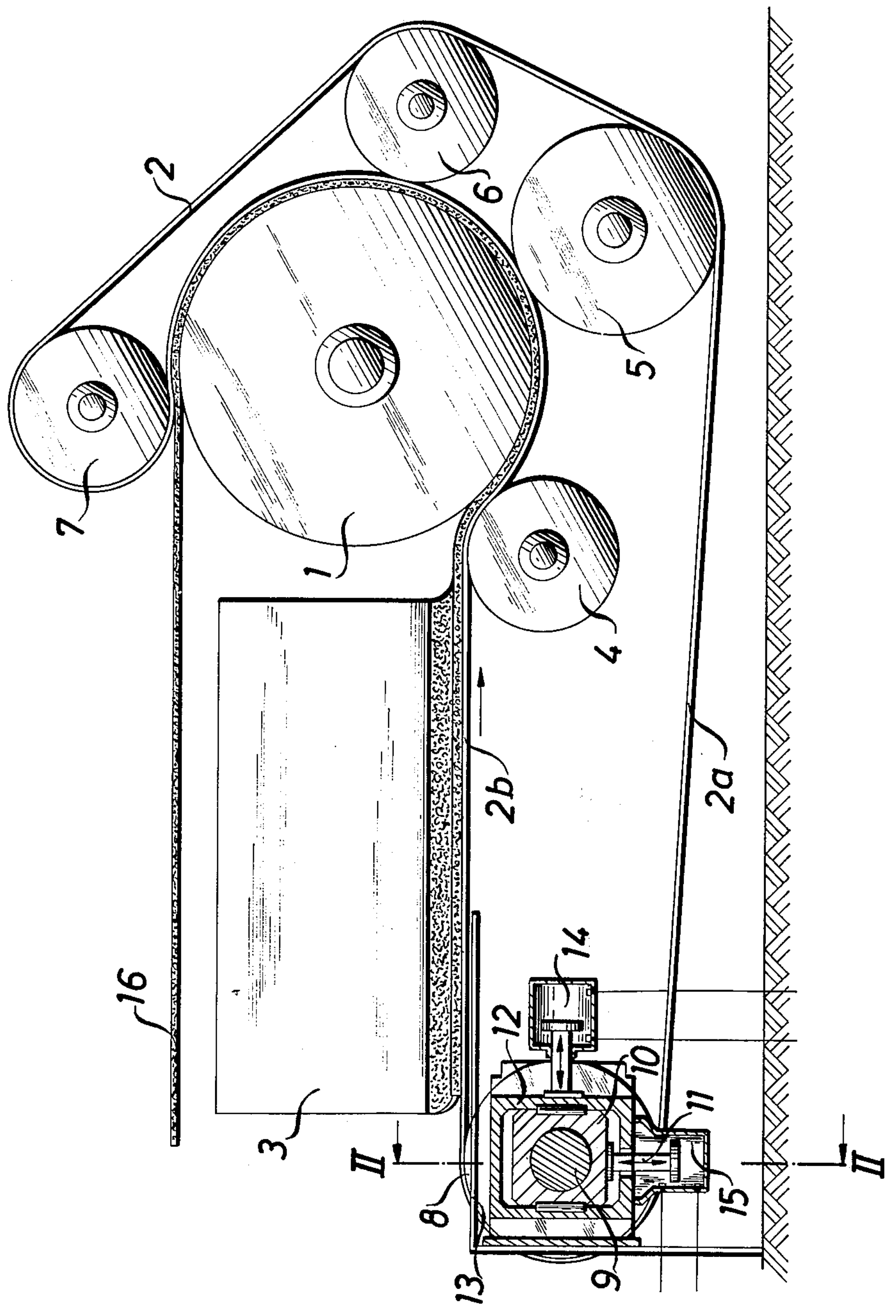

APPARATUS FOR THE CONTINUOUS MANUFACTURE OF CHIPBOARD PANELS, FIBRE PANELS OR THE LIKE

The invention relates to apparatus for the continuous manufacture of chipboard panels, fibre panels or the like.

Chipboard panels are manufactured from a ribbon of chips treated with a thermoplastics binder, pressed into panels under pressure, with simultaneous adjustment of the temperature of the chip cake.

While the pressing operation can be effected by a flat press, there is the disadvantage that, during the pressing operation, considerable variations in thickness occur over the length and breadth of the panels. An extremely uneconomical secondary finishing process is normally required to remove the thickness variation.

For the purpose of continuously producing chipboard panels, it is known, from German Pat. No. 2,050,325, to spread the ribbon of chips onto an endless belt which is passed over a heated revolving drum thereby to press the chips together into a chipboard panel between the belt and the drum by means of further presser rollers. It is possible with the apparatus described in German Pat. No. 2,050,325 to produce thin chipboard panels, that is to say with a thickness of 1.6 to 6mm. The endless belt which is used thereby is looped around approximately two-thirds of the press drum, which press drum has a diameter of approximately 3 m, the belt having a length of approximately 45 m.

According to the invention there is provided apparatus for the continuous manufacture of chipboard panels, fibre panels and the like comprising a heated and rotatable press drum, a tensioned endless belt onto which a ribbon of chips or fibres treated with a binder can be fed, an inlet roller positioned adjacent the drum such that the belt with the ribbon of chips or fibres thereon passes between the inlet roller and the drum, at least one return roller for the belt to press the belt against the drum and thereby to press the ribbon of chips or fibres between the belt and the drum, and a tensioning and control roller for the belt, the tensioning and control roller being spaced from the inlet roller thereby to provide a length of pass of the belt onto which the chips or fibres to be pressed can be fed.

Apparatus according to the invention can be substantially simplified and manufactured at lower cost, compared with the apparatus of German Pat. No. 2,050,325, particularly since the endless belt can be substantially shortened, which endless belt is formed of a special steel and two rollers can be omitted.

The tensioning and controlling of the endless belt are not effected by a belt tensioning and control roller provided specially for this purpose but by the roller which is required anyway and which is disposed beneath the spreading-on pass of the belt. The roller which was formerly a tensioning and control roller can be used as a roller for the application of pressure against a press drum and as a return roller for the endless belt. Thus, it is possible to eliminate two presser rollers. Moreover, by disposing what was formerly the tensioning and control roller directly on the large press drum, it is possible for the endless pressing belt to be substantially shortened.

Preferably, the tensioning and control roller is mounted at one end or on both ends in bearings in sliding blocks and is/are therefore jointly or separately adapted for horizontal and vertical movement. Advantageously, horizontal movement of the slide block and the vertical movement of the bearing in the slide block are performed by hydraulic or mechanical means.

Preferably, travel of the belt is monitored and, in the event of deviations, regulating means act on the vertical adjusting device of the tensioning and control roller in accordance with the values resulting from such monitoring.

To control the consolidation of the sprinkled-on ribbon of material and the pressure required for the purpose, the horizontal adjusting device is operated to adjust the tensioning and control roller.

Some at least of the return rollers can be additionally pressed against the press drum by the endless pressing belt.

Figure 2:
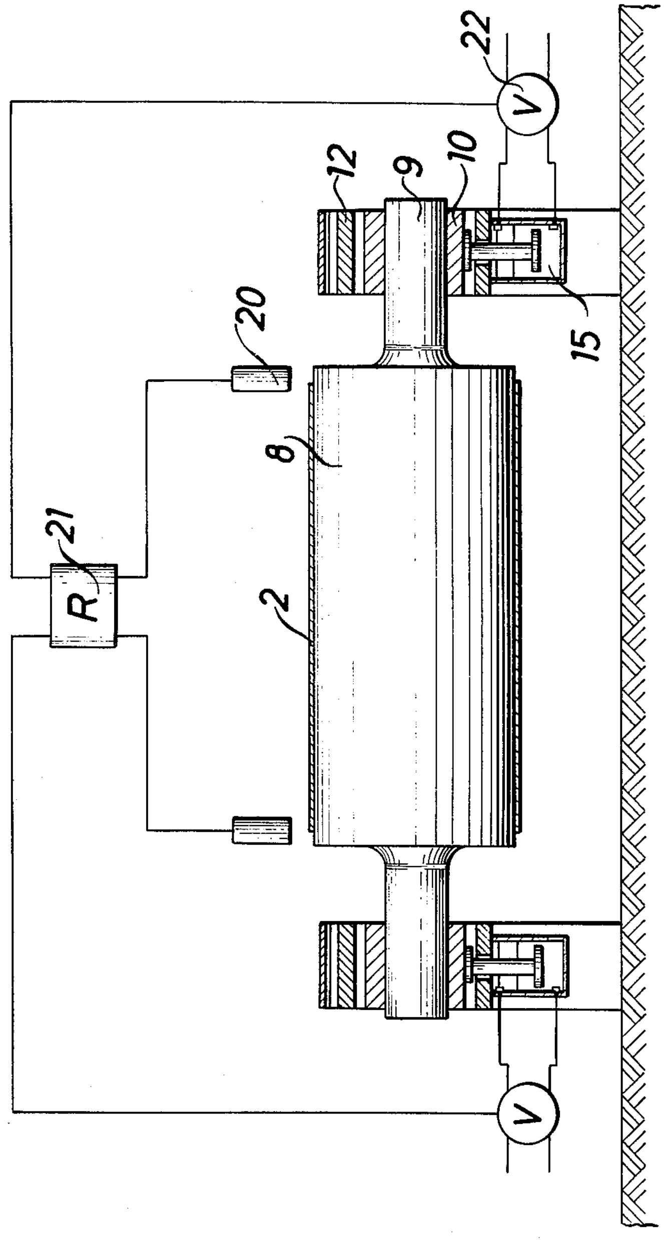

The invention is diagrammatically illustrated by way of example in the accompanying drawings, in which:

FIG. 1 shows apparatus for the continuous manufacture of chipboard panels, fibre panels and the like according to the invention; and FIG. 2 is a section taken on Line II—II of FIG. 1.

Referring to the drawings, an endless belt 2 is looped around a part of the circumference of a press drum 1. Chips or fibres are sprinkled onto a pass 2*b* of the belt 2 at a sprinkling-on station 3, and pass on the belt between an inlet roller 4 and the drum 1. Return rollers 5, 6 and 7 press against the portion of the belt 2 looped around the drum 1 and have the belt 2 pressing against their outer sides.

A tensioning and control roller 8 has the endless belt 2 looped around it and is adjustable in a horizontal and vertical direction. For this purpose, journals 9 of the roller 8 are each mounted in a sliding block bearing 10. The sliding block bearing 10 is mounted in a slide mounting 12 for displacement in a vertical direction, as indicated by the arrow 11.

The sliding mounting 12 is furthermore displaceable in a horizontal direction in a press stand 13. Vertical displacement of the slide block 10 in the slide mounting 12 is effected by one or more double-acting hydraulic rams 15 while horizontal displacement of the slide mounting 12 is effected by means of a double-acting hydraulic ram 14.

The mode of operation of the continuous pressing apparatus is as follows:

At the sprinkling-on station 3, a ribbon of chips is so sprinkled onto the endless belt 2 that fine chips lie at the bottom, coarse chips in the middle and again fine chips on top. The endless belt 2 carries this ribbon of chips into the gap between the inlet roller 4 and the rotating press drum 1. While the endless belt 2 is looped around the press drum 1 with the ribbon of chips disposed between the endless belt 2 and the press drum 1, it is subjected not only to the surface pressure generated by the endless pressing belt 2 but also linear pressure in the roller gaps between the drum 1 and return rollers 5 and 6. Since the press drum 1, the inlet roller 4 and also the return rollers 5 and 6 are heated, the ribbon of chips, while it is being pressed, is subjected to a temperature required for hardening the thermoplastics binders, in order to form glue bridges between the individual chips. A completely moulded web 16 leaves the continuous pressing apparatus in order to be fed to a further-processing machine. The press drum 1 is driven and pulls the other rollers along through the intermediary of the pressing belt. The sprinkled-on ribbon of chips initially undergoes a linear pressing action in the gap between the inlet roller 4 and the press drum 1. Subsequently, the endless belt 2 which is under tension presses the ribbon of chips against the press drum 1 so that it undergoes a surface pressure. In the gap between the return roller 5 and the press drum 1, the ribbon of chips is again subjected to a linear pressure producing a further consolidation of the glue bridges of the thermoplastics binding agent. The return roller 5 preferably has a diameter of approximately 2,000 mm, to give a broad linear zone of pressure between the roller 5 and the press drum 1. The pressing process is repeated in the gap between the return roller 6 and the press drum 1. The return roller 7 effects reversing of the direction of travel of the belt and is so disposed that the ready-pressed strip 16 of chips can be withdrawn in a horizontal direction and without further curvature from the continuous pressing apparatus.

By means of the fact that what was formerly the tensioning and control roller is in the case of the present invention used as a pressing and return roller for the endless belt 2, it is possible to eliminate two presser rollers previously needed. Tensioning and controlling of the endless belt 2 is effected by the roller 8. The use of this roller as a tensioning and control roller has surprising advantages. Initially, since there is quite a considerable free surface area of belt, i.e. the very long upper belt pass 2*b* under the sprinkling station 3 and a very long lower belt pass 2*a* between the roller 5 and the roller 8, it is possible to keep the belt far more effectively taut. In addition, the endless belt 2 exerts a pressure on the return rollers 5 and 6. Since this pressure is quite considerable due to the fact that the belt 2 is subject to tension, it is possible for the hydraulic pressure-applying equipment for the rollers 5 and 6 to be made substantially weaker than would otherwise be required. By reason of this measure, too, the cost of the machine can be greatly reduced. The roller 6 preferably has a diameter of approximately 1,500 mm while the roller 5 has a diameter of approximately 2,000 mm, a weaker construction of the hydraulic drive arrangements for these rollers is consequently a considerable saving.

A further advantage according to the invention which arises due to the shortening of the endless pressing belt 2, is that the tensioning and control roller 8 results in the endless belt 2 being controlled substantially more gently.

FIG. 2 shows the arrangements for controlling the belt. The running of the belt is scanned by sensors 20. Scanning can be effected photoelectrically or by other suitable means. In the event of any divergencies from the normal belt running, for example to the right in the drawings, the sensor 20 emits a pulse to a controller 21 which in turn so controls a two-way valve 22 that when the belt 2 is running to the right, the right-hand hydraulic ram 15 raises the sliding block bearing 10 by a certain distance, so that the endless pressing belt 2 moves leftwardly. By reason of the fact that the bottom pass 2*a* of the pressing belt 2 is very long (approximately 12 m), there is far more free length of belt which is not being stretched over rollers and which is available for belt control. But also the upper pass 2*b* of the belt, under the moulding station 3, is free-running over quite a considerable length (8 m) and can thus be advantageously utilised for precise belt control.

Preferably, additional central regulating arrangements, not shown, avoid any constant lateral belt movement.

In the case of known apparatus, far less free length of belt is available for belt control so that the unilaterally created tension in the belt 2, during control, is distributed over a very short length of belt and the life of the belt is therefore shortened. With the roller 8 constructed as the control roller and by reason of the substantial lengthening of the exposed belt area 2*a* and 2*b* of the pressing belt 2 which is achieved thereby, this disadvantage is overcome.

The following surprising advantages which go parallel with the solution of the problem have also been established:

a. a possible shortening of the pressing belt by approximately 10 m.

b. the saving of two presser rollers since what used to be the tensioning roller for the endless pressing belt can also be used as a larger-diameter press roller. By virtue of the fact that the former tensioning roller has a larger diameter than the presser rollers according to the state of the art, the zone of pressure in this gap between the rollers is made substantially wider, so that the application of pressure on the ribbon of chips is substantially improved;

c. a considerable improvement in belt control which substantially prolongs the effective life of the endless steel belt, because the necessary unilateral lengthening of the pressing belt during control of the belt is distributed over a portion of belt which is more than twice as long as it was previously;

d. by reason of the fact that the pressing belt 2 is stretched around the presser rollers 5 and 6 and thus exerts additional pressure on the presser rollers which acts in the direction of the press drum 1, hydraulic pressure-applying means for the rollers 5 and 6 can be made substantially weaker. The belt-tensioning force is therefore at the same time used as a pressure-applying force for the rollers 5 and 6. Listed below for purposes of comparison are two examples; firstly a comparative example for a continuous press according to German Pat. No. 2,050,325.

| | | |
|---|---|---|
| 1. Diameter of press drum: | approx. | 3,000 mm |
| 2. Diameter of return rollers, including the original rear tensioning roller: | approx. | 1,400 mm |
| 3. Heating zone (length of belt looped around the press drum): | approx. | 6 m |
| 4. Heating time (peripheral speed 15 m/min): | approx. | 24.0 sec. |
| 5. Belt length: | approx. | 45 m |
| Example 2, apparatus according to the present invention: | | |
| 1. Heating drum diameter: | approx. | 4,000 mm |
| 2. Return roller diameter 4, 6, 7 and 8: | approx. | 1,500 mm |
| roller 5 diameter: | approx. | 2,000 mm |
| 3. Heating zone: | approx. | 7.5 m |
| 4. Heating time (peripheral speed 15 m/min): | approx. | 30 sec. |
| 5. Belt length: | approx. | 33 m |

Closer examination of these comparative examples will show that despite the fact that the diameter of the central press drum 1 has been increased by 1,000 mm, namely to 4,000 mm, thus at the same time obtaining a longer heating zone of approximately 7.5 m, the belt 2 is shortened by approximately 12 m, namely to 33 m. A lengthening of the heating and pressing zone to approximately 7.5 m, however, for the same thickness of panel, results in a substantial increase in the output of the machine, because for the same binder hardening time, the machine can be operated at a higher peripheral speed. If a machine according to example 1 had been equipped with a press drum of 4,000 mm diameter in order to obtain a longer heating path of approximately 7.5 m, then this measure would indubitably have resulted in a further lengthening of the pressing belt.

As already mentioned, in the case of apparatus according to the present invention, the length of the lower free belt pass 2*a* is approximately 12 m and the length of the upper free belt pass 2*b* is approximately 8 m. It is these very long free portions 2*a* and 2*b* of the belt 2 which provide the particularly advantageous belt control arrangements. In the case of apparatus according to the state of the art, the distance from the rear tensioning roller (in the drawing in German Specification No. 2,050,325 the tensioning roller 6), from the support point to the support point at the reversing roller 5 is approximately 5 m. The portion of belt between the tensioning roller 6 and the reversing roller 7 according to the aforesaid German Patent amounts to approximately 4 m. This information will make it readily obvious that only very little exposed area of belt is available for control of the endless belt. Nevertheless, if it is desired to achieve a system of control which can be carried out in an acceptable time, then the endless pressing belt can be stretched on one side. Since this stretching has to be carried out on a very short portion of belt, it is possible that the pressing belt may show an incipient tear on one side during regulation.

In order to achieve an improved or repeated linear pressing of the ribbon of chips, it is possible to dispose between the return roller 6 and the reversing roller 7, a further presser roller which gives significant advantages, particularly for the production of qualitatively thicker chipboard panel webs of a thickness of approximately 8 to 16 mm.

What is claimed is:

1. In apparatus for the continuous manufacture of pressed panels of particulate material, a heated and rotatable press drum, a tensioned endless belt onto which a ribbon of particulate material treated with a binder can be fed, an inlet roller positioned adjacent said drum such that said belt with said ribbon of particulate material thereon passes between the inlet roller and the drum, at least one return roller for said belt to press said belt against said drum and thereby to press said ribbon of particulate material between said belt and said drum, a tensioning and control roller for said belt, said tensioning and control roller being so spaced and disposed with respect to said inlet roller that, between said tensioning and control roller and said inlet roller, said belt extends in a substantially horizontal pass, and means positioned above said substantially horizontal pass of said belt to feed said particulate material onto said substantially horizontal pass of said belt.

2. Apparatus as claimed in claim 1, wherein said tensioning and control roller is mounted at one of its ends in a bearing in a sliding block whereby said one of its ends is adapted for horizontal and vertical movement.

3. Apparatus as claimed in claim 1, wherein said tensioning and control roller is mounted at each of its ends in a bearing in a sliding block whereby each of said ends is adapted for horizontal and vertical movement independently of the other of its ends.

4. Apparatus as claimed in claim 3, including hydraulic means to effect horizontal and vertical movements of said sliding blocks.

5. Apparatus as claimed in claim 4, including means to monitor travel of said belt and regulating means to cause vertical movement of said ends of said tensioning and control roller in the event of deviations from a desired path of said belt and detected by said means to monitor.

6. Apparatus as claimed in claim 3, including means to sense the tension in said belt and regulating means to effect horizontal movement of said tensioning and control roller to obtain desired tension in said belt to obtain a desired consolidation of the sprinkled-on ribbon of particulate material.

7. Apparatus as claimed in claim 1, wherein at least two of said return rollers are provided and are additionally pressed against said drum by said belt.

* * * * *